(12) United States Patent
Goldberg

(10) Patent No.: US 8,832,920 B2
(45) Date of Patent: Sep. 16, 2014

(54) STANDOFF ADAPTOR FOR A THREADED HOLLOW WALL ANCHOR

(75) Inventor: Matt Goldberg, Indianapolis, IN (US)

(73) Assignee: Accurate Manufactured Products Group, Inc., Indianapolis, IN (US)

( * ) Notice: Subject to any disclaimer, the term of this patent is extended or adjusted under 35 U.S.C. 154(b) by 264 days.

(21) Appl. No.: 13/448,837

(22) Filed: Apr. 17, 2012

(65) Prior Publication Data

US 2013/0269170 A1    Oct. 17, 2013

(51) Int. Cl.
*F16B 33/00* (2006.01)

(52) U.S. Cl.
USPC ............ 29/525.02; 29/525.01; 248/201; 248/216.1; 248/218.3; 248/231.91; 248/475.1; 411/372.5; 411/384; 411/372.6

(58) Field of Classification Search
CPC ............ F16M 13/02; G09F 7/18; G09F 7/20; A47G 1/16; A47G 1/1646; A47G 3/00; A47F 5/08; E06B 3/5436; E04F 13/0853; F16B 15/0007; F16B 15/02; F16B 5/0233
USPC ............ 29/525.01, 525.02; 248/201, 216.1, 248/218.3, 231.91, 490, 475.1; 411/372.5, 411/384, 372.6; 40/607.13
See application file for complete search history.

(56) References Cited

U.S. PATENT DOCUMENTS

| 6,974,290 | B2 * | 12/2005 | Pountney | ............... 411/384 |
| 7,506,464 | B2 * | 3/2009 | Tarter et al. | ............... 40/596 |
| 2009/0326533 | A1 * | 12/2009 | Dell'Oca | ............... 606/64 |

OTHER PUBLICATIONS

Web page—DISPLAYS2GO—These economic sign mounts are machined in aluminum—http://www.displays2go.com/Product.aspx?ID=9685, (print-out dated on Feb. 15, 2012)

* cited by examiner

*Primary Examiner* — David Bryant
*Assistant Examiner* — Jun Yoo
(74) *Attorney, Agent, or Firm* — Woodard, Emhardt, Moriarty, McNett & Henry LLP

(57) ABSTRACT

A standoff adaptor for a threaded hollow wall anchor for mounting an item to a wall. A threaded member has a washer mounted thereon with a recess to receive and contact the head of a mounting anchor. The distal end of the threaded member is received into a standoff having at its opposite end a bolt threadedly mounted thereto for holding an item between the bolt and standoff.

8 Claims, 4 Drawing Sheets ized on each end or a tapped hole
STANDOFF ADAPTOR FOR A THREADED HOLLOW WALL ANCHOR

BACKGROUND OF THE INVENTION

1. Field of the Invention

The present invention relates generally to the field of sign mounts, sign supports and standoffs to mount items to a wall in spaced relationship.

2. Description of the Prior Art

Signs are mounted on walls using standoffs, which are different shaped metal parts that "standoff" the sign from the wall. These standoffs come in many shapes, sizes and materials. They all have a tapped hole on each end or a tapped hole extending through the standoff that accepts a screw with a machine screw thread.

Standoffs are mounted to the wall using a piece of hardware called a hangar bolt. Hanger bolts consists of a wood screw thread that goes into the wall and a machine screw thread that fastens the standoff. Sign designers and installers have problems with this type of a system, as the wood screw thread can tear up the wall, and the load that can be affixed to them is hard to determine.

A spacer may be fixed to the wall by means of a screw that extends into a wall anchor fixedly mounted in the wall. Commercially available wall anchors include a threaded hollow interior to receive the screw securing the spacer to the wall. The anchor has a head located slightly outward of the wall with the main body of the anchor being expandable against the interior of the wall securely mounting the anchor. Alternatively, the wall anchor may be threaded into the wall with the drywall tightly gripping the anchor.

In the event the spacer has a width or diameter equal to the width of the head of the wall anchor, then the load resulting from the weight of the sign or other item mounted to the spacer is directed entirely into the spacer and not the outside surface of the wall surrounding the anchor head. On the other hand, if the spacer has a width or diameter larger than the anchor head, then there is a tendency for the spacer to rock back and forth resulting from the gap existing between the spacer and the mounting wall that surrounds the anchor head. Disclosed herein is a standoff adaptor for use with a threaded hollow wall anchor that eliminates these disadvantages existing in the prior art standoffs.

SUMMARY OF THE INVENTION

One embodiment of the present invention is a standoff adaptor for a threaded hollow wall anchor for mounting an item to a wall including an externally threaded cylindrical main body having a first end to extend into the internally threaded hollow wall anchor mountable to a wall and further having a second end forming a head. A spacer is on the main body and positioned between the first end and the second end. The spacer has a first load transfer surface to face the anchor and wall and further has a standoff engageable surface facing oppositely of the first load transfer surface. The main body has first external threads between the first end and the spacer and second external threads between the spacer and the second end. A standoff has a second load transfer surface abutable against the first load transfer surface. The standoff is internally threaded and is meshing engageable with the second external threads to mount thereto. The standoff has a length to extend outwardly of the cylindrical main body to receive an item to be mounted thereto in spaced relationship to the wall.

It is an object of the present invention to provide a new and improved device for mounting an item in space relationship to a wall.

A further object of the present invention is to provide a standoff adaptor for use with a threaded hollow wall anchor.

Related objects and advantages of the present invention will be apparent from the following description.

DESCRIPTION OF THE PREFERRED EMBODIMENT

Figure 1:
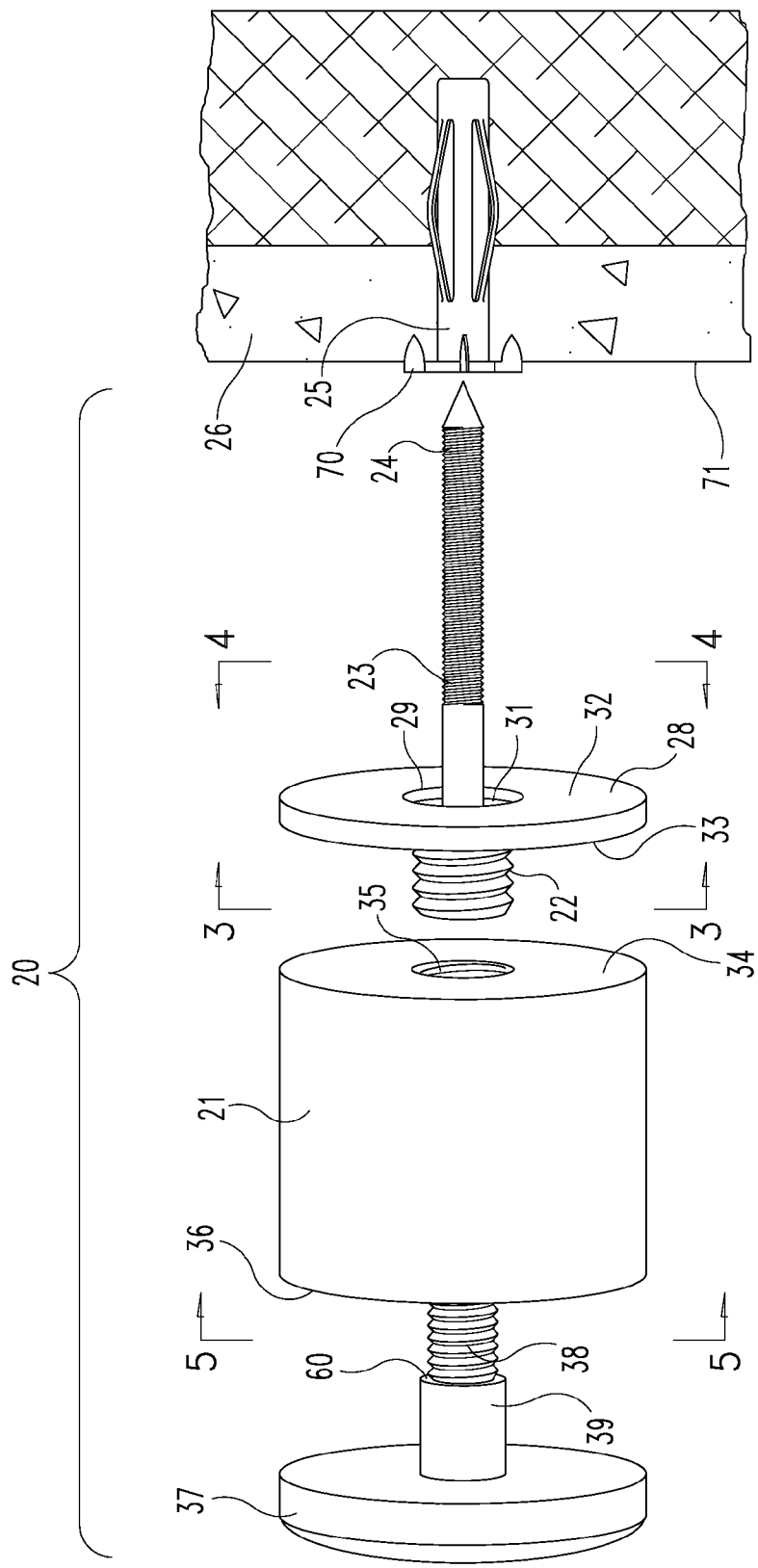
FIG. 1 is an exploded view of a standoff adaptor shown in position to extend into a threaded hollow wall anchor.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
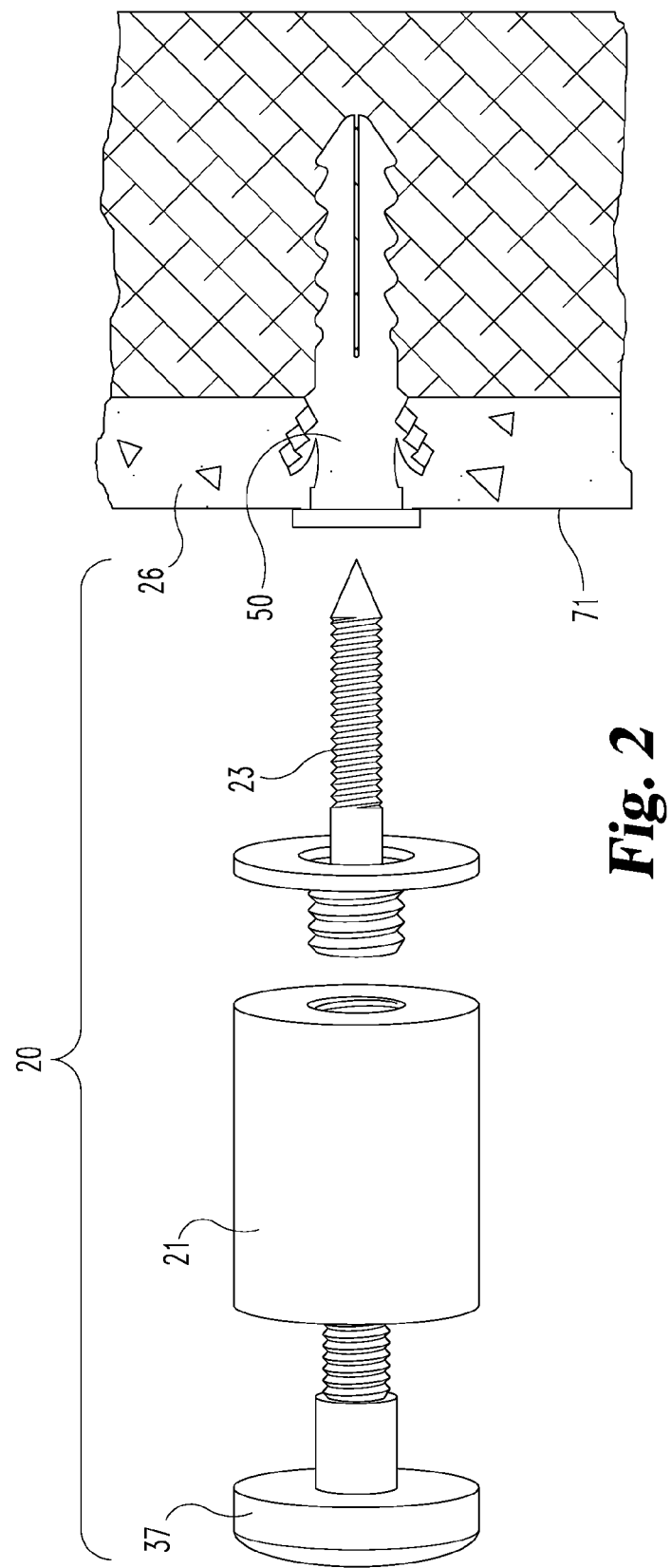
FIG. 2 is the same view as FIG. 1 only showing a different hollow wall anchor.

Referring more particularly to FIGS. 1 and 2, there is shown a standoff adaptor 20 for mounting to the threaded hollow wall anchor 25 (FIG. 1) and the threaded hollow wall anchor 50 (FIG. 2). Adaptor 20 is used to mount an item, including signs, posters, etc. to wall 26. The adaptor includes an externally threaded cylindrical main body 23 having a first end 24 to extend into the internally threaded hollow wall anchor 25 or 50. The second end 22 of main body 23 also is externally threaded and forms a head which is extendable into hole 35 of standoff 21. A washer shaped spacer 28 has internal threads and is threadedly mounted on the external threads of head 22. Threaded end 38 of shoulder bolt 37 is then threaded into the outer end 36 of standoff 21 with the item to be mounted being located either on the cylindrical middle portion 39 of bolt 37 or between the end 36 of standoff 21 and the inwardly facing shoulder surface 60 of bolt 37.

Figure 3:
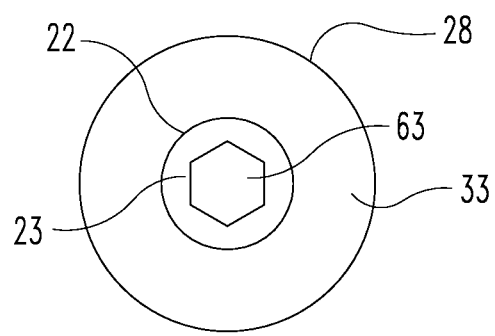
FIG. 3 is an end view looking in the direction of arrows 3-3 of FIG. 1.
Figure 4:
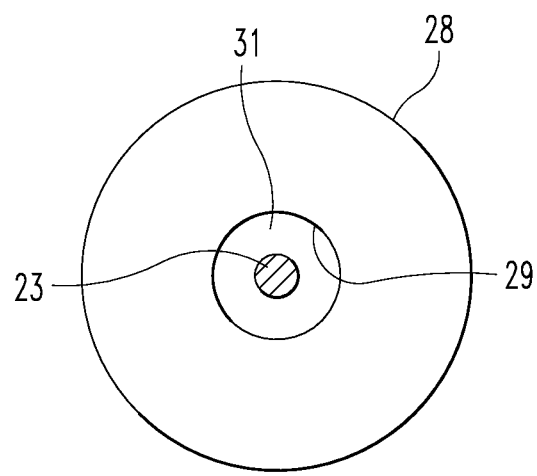
FIG. 4 is a cross-sectional view looking in the direction of arrows 4-4 of FIG. 1.

Threaded cylindrical main body 23 has a socket recess 63 formed in end 22 to engage a complementary tool, such as an alien head wrench. In embodiment shown in FIG. 3, socket 63 is hexagonal in shape although it is understood that a variety of polygonal configurations may be utilized for the socket. A wrench may be inserted into socket 63 in order to rotate threaded main body 23 as end 24 extends into wall anchor 25 or 50 with the external threads of end portion 24 of main body 23 being in meshing engagement with the internal threads of either wall anchor 25 or 50.

Spacer 28 has an inwardly facing surface 32 that abuts against the outside surface 71 of wall 26. A recess 29, such as a counter bore, is formed in surface 32 thereby allowing the bottom surface 31 of recess 29 to contact the outwardly facing surface of anchor head 70 that projects slightly away from the outwardly facing surface of wall 26. Threaded member 23 extends through spacer 28; however, the externally threaded end 22 extends only partially into the spacer and does not extend into recess 29 allowing a couterbore surface 31 (FIG. 1) to be formed in recess 29 around member 23. As threaded main body 23 is extended into and tightened to wall anchor 25 or 50, the head 70 of the wall anchor projects into recess 29 contacting surface 31 while surface 32 contacts the outwardly facing surface 71 of wall 26 that surrounds head 70. In this manner, the threaded rod 23 is prevented from rocking since the load applied to the threaded rod by the weight of the item hung to standoff 21 is applied through surfaces 31 and 32 to the outwardly facing surface of head 70 and mounting surface 71 of wall 26.

Similarly, anchor 50 (FIG. 2) includes a head that projects slightly away from the outwardly facing surface 71 of mounting wall 26.

Anchors 25 and 50 are similar in that each extends through wall 26 with the head 70 of the anchor mount located slightly outward of mounting surface 71. Anchors 25 are typically produced from metal whereas anchors 50 may be metal or plastic. Both anchors are commercially available in hardware stores. The main distinction between the two anchor mounts is that anchor 25 includes an expandable middle section that abuts against the inwardly facing surface of wall 26 as the anchor mount is initially installed with the two ends of the anchor mount being contracted thereby forcing the weakened middle portion outwardly. Anchor mount 50 typically includes a main body that is separated into outwardly extending winged portions as a screw is forced into the anchor mount.

Standoff 21 may take a variety of external shapes. In FIGS. 1 and 2, standoff 21 is depicted as having a cylindrical shape; however, it is to be understood that other shapes including oval, square etc. may be utilized. The outside diameter of standoff 21 is slightly greater than the outside diameter of spacer 28 so as to conceal the spacer as the standoff is tightened onto externally threaded end 22. Hole 35 of standoff 21 is internally threaded to receive the threaded end 22 of main body 23. The standoff is threaded onto end 22 so that the inwardly facing 34 of standoff 21 contacts the outwardly facing surface 33 of spacer 28 thereby transferring the load from the item mounted to standoff 21 to spacer 28.

Figure 5:
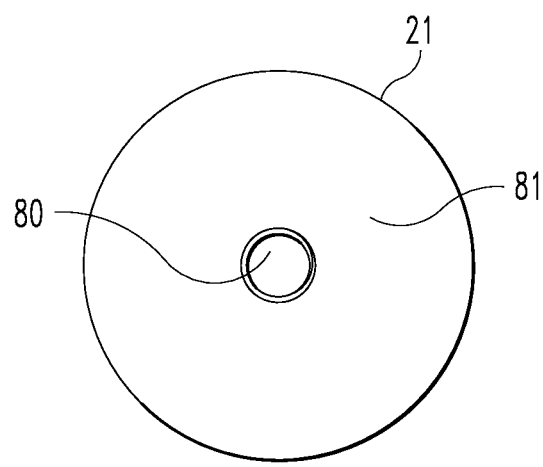
FIG. 5 is an end view of the standoff looking in the direction of arrows 5-5 of FIG. 1.
Figure 6:
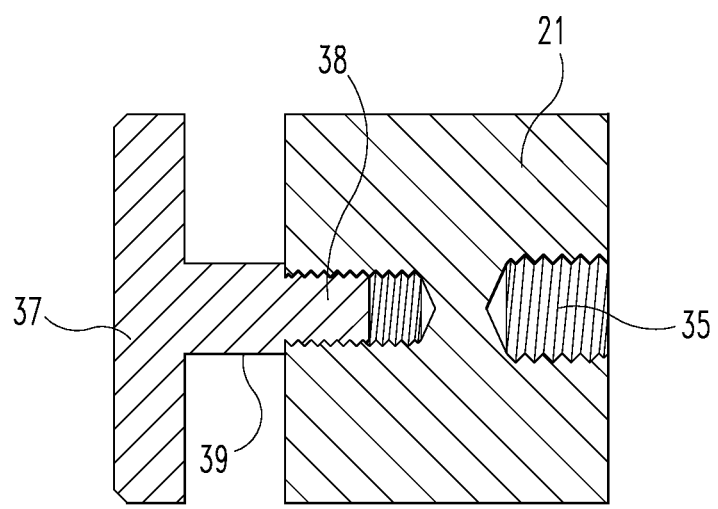
FIG. 6 is a cross-sectional view showing a shoulder screw mounted to the standoff.

End 36 of standoff 21 has a internally threaded hole 80 (FIG. 5) with the outwardly facing surface 81 of the standoff facing a conventional shoulder bolt or other fastening device 37 having external threads in meshing engagement with the internal threads within hole 80. Shoulder bolt 37 (FIG. 6) has a threaded end portion 38 separated from the bolt head by a smooth cylindrical shoulder portion 39. The diameter of portion 39 is greater than the end portion 83 forming shoulder 60. In order to mount an item to adaptor 20, bolt 37 is removed from standoff 21 with the threaded portion 38 and shoulder portion 39 of the bolt being extended through the item to be mounted to the adaptor. Bolt 37 is then threaded into standoff 21 supporting the item to the standoff. Alternatively, the item to be mounted to adaptor 20 may be gripped between surface 81 of standoff 21 and the shoulder 60 formed on bolt 37 between cylindrical portion 39 and the threaded end portion 38. The weight of the item supported by the adaptor is transferred between surfaces 34 and 33 to surfaces 31 and 28 and then to head 70 and mounting surface 71 of wall 26.

Many variations are contemplated and included in the present invention. For example, end portion 24 is shown in FIGS. 1 and 2 as having an outside diameter smaller than the outside diameter of end portion 22; however, portions 22 and 24 may have equal diameters. Likewise, a bolt other than shoulder bolt 37 may be utilized to threadedly mount the item to be hung or supported by standoff 21. That is, threaded portion 83 of the bolt may extend entirely up to the head(cap) of the bolt with the item to be supported by the spacer then being gripped between the inwardly facing surface of the head and the outwardly facing surface 81 of spacer 21. For example, a set screw may be used in lieu of a shoulder screw with the set screw protruding from the cap. The head or cap of the screw is typically the same diameter as standoff 21. The particular thread provided on end 24 of main body 23 may be varied. That is, for a smaller diameter standoff, such as ⅜ inch and ½ inch, the thread may be course machine thread that extends into the wall anchor. Notably, the tip of end portion 24 is pointed to be self-centering in the wall anchor. It is best that the threads provided on end portion 24 match the original screw that is used to install the wall anchor.

The method of mounting an item in space relationship to a wall includes a step of providing a wall anchor with a head, an externally threaded main body, a spacer on the main body, a standoff and a fastening device. The wall anchor is first mounted to the wall. Spacer 28 is mounted to threaded main body 23 and then threadingly mounted to the wall anchor. This later step includes the sub-step of extending end portion 24 into the wall anchor so that the main body extends outwardly, namely end portion 22 from the wall anchor in the wall. Simultaneously, the spacer 28 is positioned against the head 70 of the anchor which extends into recess 29 with surface 28 of the spacer contacting the mounting surface 71 surrounding the anchor head. The spacer is positioned against the wall anchor by rotating the main body 23 relative to the wall anchor until the spacer is against the wall anchor thereby transferring load on the spacer to the wall anchor. Next, the standoff is threadedly mounted onto threaded main body 23 outwardly of spacer 28 by rotating standoff 21 onto the threaded member 23. Last, the method includes a step of mounting an item such as a sign, etc. onto the standoff while spacing the item apart from the wall.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A Standoff Adaptor for a Threaded Hollow Wall Anchor for mounting an item to a wall comprising:

an externally threaded cylindrical main body having a first end to extend into an internally threaded hollow wall anchor mountable to a wall and further having a second end forming a head;

a spacer on said main body and positioned between said first end and said second end, said spacer having a first load transfer surface to face the anchor and wall and further having a standoff engageable surface facing oppositely of said first load transfer surface, said main body having first external threads thereon between said first end and said spacer and second external threads thereon between said spacer and said second end; and, a standoff having a second load transfer surface abutable against said standoff engageable surface, said standoff being internally threaded and meshing engageable with said second external threads to mount thereto, said standoff having length to extend outwardly of said cylindrical main body to receive an item to be mounted thereto in spaced relationship to the wall; and wherein:

said main body includes a tool engageable surface to allow the main body to be rotated into the anchor, said first load transfer surface is sized relative to the anchor to transfer load from said second load transfer surface to the anchor and wall, said standoff has a proximal end mountable to said head and a distal end; and further comprising:

a shoulder screw having a threaded end in meshing engagement with said distal end and an unthreaded shoulder located outwardly of said threaded end to mountingly receive an item to be mounted to a wall; and wherein:

said main body has a first portion with a first diameter between said first end and said spacer and a second portion integral with said first portion of a second diameter greater than said first diameter between said spacer and said second end, said spacer is threadedly mounted onto said second portion of said main body; and, said spacer has a recess on said first load transfer surface to receive the anchor.

2. The combination for mounting an item with weight in spaced relationship to a mounting surface comprising:

a threaded hollow wall anchor having an anchor main body for extending into a mounting surface and a head joined to said anchor main body that is positionable against the mounting surface;

an externally threaded rod having a first end portion meshingly engageable with said anchor and having an opposite second end portion with a tool engageable surface to rotate said rod into said anchor;

a washer mounted on said second end portion with a load transfer surface facing said anchor and the mounting surface and having an load receiving surface facing oppositely of said load transfer surface;

a spacer threaded onto said second end portion and having a proximal end contactable with said load receiving surface of said washer, said spacer has a threaded distal end; and, a screw meshingly engageable with said threaded distal end of said spacer for receiving an item to mount to a wall transferring load from the weight of the item to said spacer and then to said washer and through said load transfer surface to said anchor and mounting surface; and wherein;

said washer includes a recess on said load transfer surface to receive and contact said head and transfer load onto said head with said load transfer surface surrounding said recess in contact with the mounting surface to transfer load onto the mounting surface.

3. The combination of claim 2 wherein:
said screw is a set screw.

4. The combination of claim 2 wherein:
said rod extends threadedly into said spacer, through said spacer and threadedly into said anchor.

5. The combination of claim 2 wherein:
said washer is threadedly mounted on said threaded rod.

6. The combination of claim 3 wherein:
said first end portion of said threaded rod has a diameter less than said second end portion with said tool engageable surface forming a socket in said second end portion, said spacer has an equal diameter relative to said washer and greater than said rod.

7. The combination for mounting an item with weight in spaced relationship to a mounting surface comprising:

a hollow wail anchor having an anchor main body for extending into a mounting surface and a head joined to said anchor main body that is positionable against the mounting surface;

a rod to mountingly extend into said anchor and having a first end portion engageable with said anchor and having an opposite second end portion;

a washer mounted on said second end portion with a load transfer surface facing said anchor and the mounting surface and having a load receiving surface facing oppositely of said load transfer surface;

a spacer on said second end portion and having a proximal end contactable with said load receiving surface of said washer, said spacer has a distal end; and, a mount on said distal end of said spacer for receiving an item to mount to a wall transferring load from the weight of the item to said spacer and then to said washer and through said load transfer surface to said anchor and mounting surface; and wherein;

said washer includes a recess on said load transfer surface to receive and contact said head and transfer load onto said head with said load transfer surface surrounding said recess in contact with the mounting surface to transfer load onto the mounting surface.

8. The combination for mounting an item with weight in spaced relationship to a mounting surface with a wall anchor having an anchor main body for extending into the mounting surface and a head joined to said anchor main body that is positionable against the mounting surface comprising;

a rod to mountingly extend into said anchor and having a first end portion engageable with said anchor and having an opposite second end portion;

a washer mounted on said second end portion with a load transfer surface facing said anchor and the mounting surface and having a load receiving surface facing oppositely of said load transfer surface;

a spacer on said second end portion and having a proximal end contactable with said load receiving surface of said washer, said spacer has a distal end; and, a mount on said distal end of said spacer for receiving an item to mount to a wall transferring load from the weight of the item to said spacer and then to said washer and through said load transfer surface to said anchor and mounting surface; and wherein;

said washer includes a recess on said load transfer surface to receive and contact said head and transfer load onto said head with said load transfer surface surrounding said recess in contact with the mounting surface to transfer load onto the mounting surface.

\* \* \* \* \*